Oct. 29, 1946.   C. ROE   2,410,239
AIRPLANE
Filed Nov. 20, 1942   4 Sheets-Sheet 1
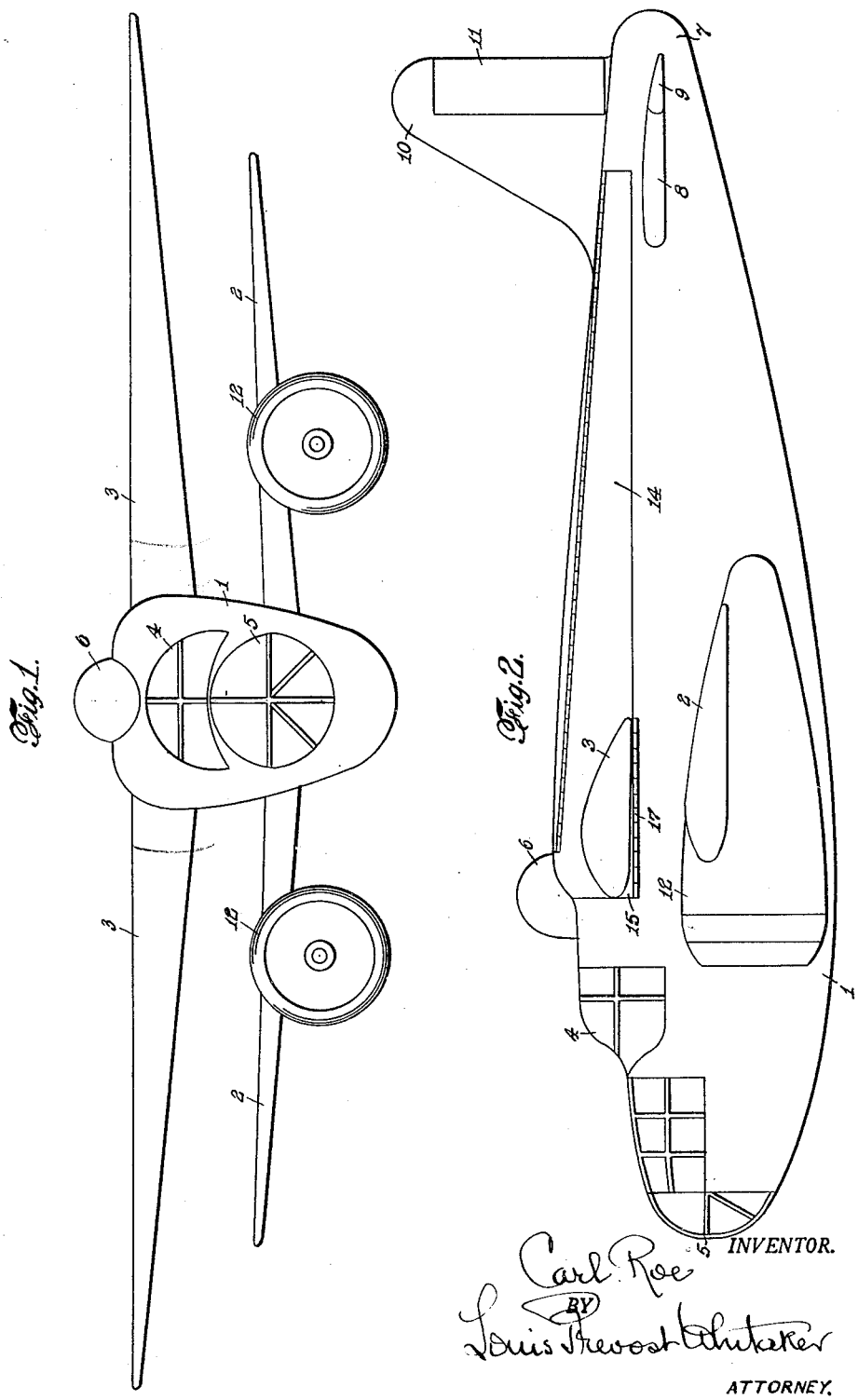
INVENTOR.
Carl Roe
BY
Louis Prevost Whitaker
ATTORNEY.

Oct. 29, 1946. C. ROE 2,410,239
AIRPLANE
Filed Nov. 20, 1942 4 Sheets-Sheet 2

INVENTOR.
Carl Roe
BY
Louis Prevost Whitaker
ATTORNEY.

Oct. 29, 1946.     C. ROE     2,410,239
AIRPLANE
Filed Nov. 20, 1942     4 Sheets-Sheet 3

INVENTOR.
Carl Roe
BY Louis Prevost Whitaker
ATTORNEY.

Oct. 29, 1946.  C. ROE  2,410,239
AIRPLANE
Filed Nov. 20, 1942  4 Sheets-Sheet 4
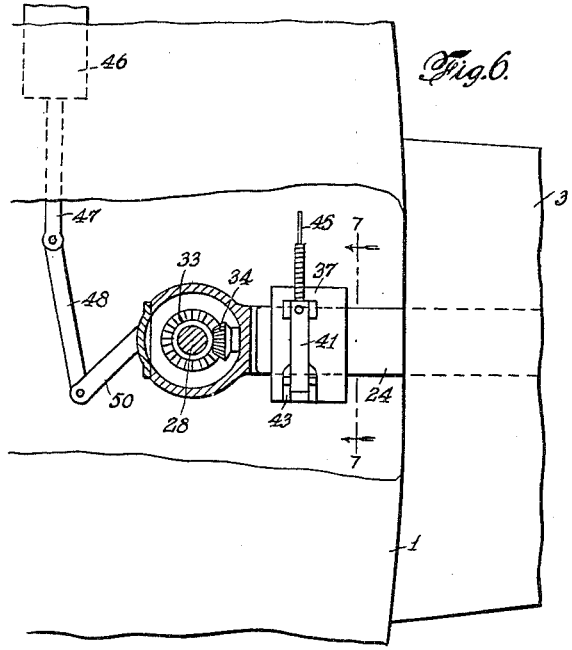
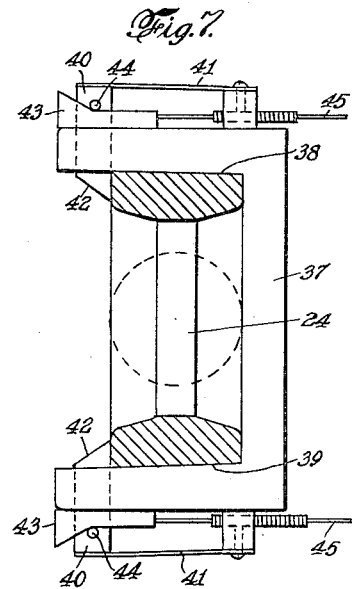
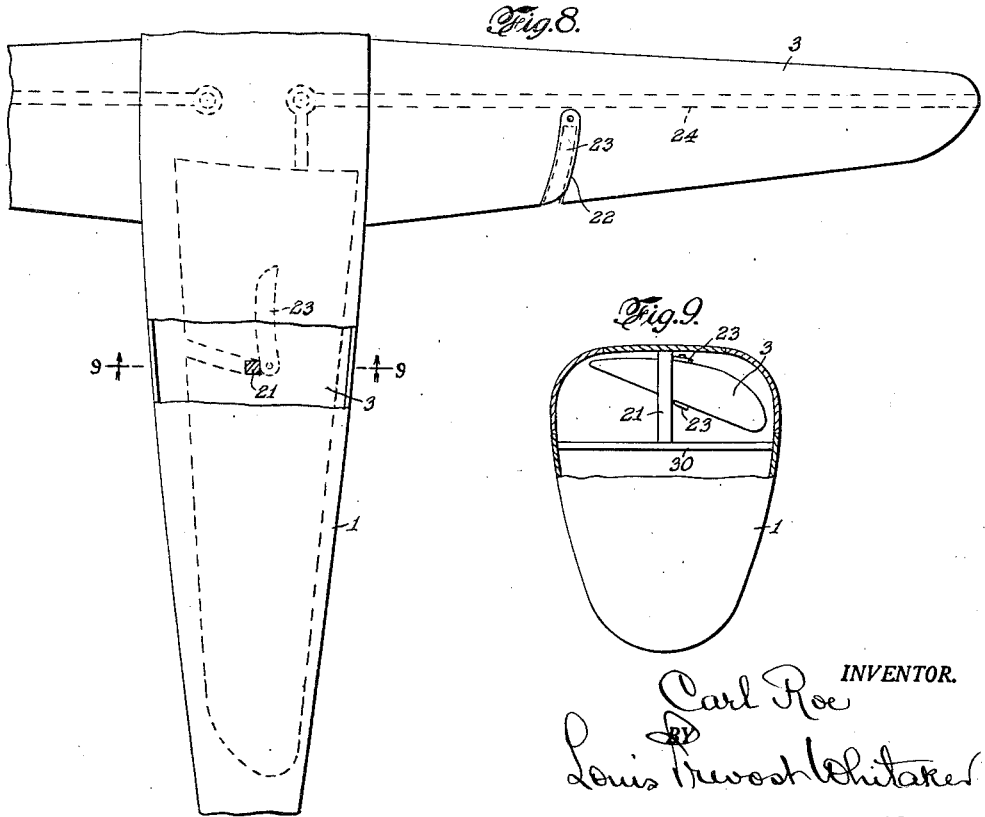
INVENTOR.
Carl Roe
BY Louis Prevost Whitaker
ATTORNEY.

Patented Oct. 29, 1946

2,410,239

UNITED STATES PATENT OFFICE 2,410,239

AIRPLANE

Carl Roe, Mineola, N. Y.

Application November 20, 1942, Serial No. 466,267

10 Claims. (Cl. 244—49)

My invention consists in the novel features hereinafter described, reference being had to the accompanying drawings which illustrate one embodiment of the same selected by me for purposes of illustration, and the said invention is fully disclosed in the following description and claims.

The present invention relates to aircraft and is concerned with the problem of attaining high speed in flight, greater load carrying capacity for economical operation, and safe take-off and landing characteristics.

The requirements of wing design for take-off and landing are directly contrary to those for high speed. The lift provided by an airplane wing depends on the wing area, the airfoil section, in particular the camber or relative thickness of the wing, the angle of attack, i. e., the angle at which the wing meets the air stream, and the velocity of the airplane. To provide adequate lift at the low speed desirable for take-off and landing, a thick wing of large area and correspondingly low wing loading should be used. However, the drag of such wings at high speeds is so great that the speed obtainable is strictly limited and the power consumed in overcoming the drag results in uneconomical operation. In order to obtain high speed and efficient operation, a plane should have small thin wings having minimum drag. At high velocities, such as 400 to 600 miles per hour, the small wings provide adequate lift, and the resulting high wing loading is not only unobjectionable but in fact contributes to efficient operation of the airplane. However, the high wing loading results in a high stalling speed, making it impossible to reduce the speed of the plane to a safe landing speed, and likewise impossible to get the plane off the ground with full load. Hence, small area low camber wings designed for ultra high speeds are wholly unsuitable for safe take-offs and landings. Moreover, the load carrying capacity of a conventional airplane in flight is much greater than under take-off conditions, so that if it were possible to get off the ground with the full load that could be carried in flight, the efficiency and economy of operation of the airplane would be greatly increased.

It has been proposed to add part of the load of an airplane after take-off, for example, additional fuel, but such operations are difficult and time consuming. Various devices have also been proposed to increase the lift of the airplane under take-off and landing conditions, but for various reasons such as failure to provide sufficient lift, to serve the intended purpose, increasing the drag and disturbing the flight characteristics of the plane in flight condition, and involving too many complications to be practical and reliable, these devices have been unsatisfactory. Thus, none of the prior art devices has presented a satisfactory solution to the problem of providing an airplane which will combine exceptionally high speed, high load carrying capacity and economical operation with safe take-off and landing characteristics, and the ability to get into the air with the whole load the plane is capable of carrying under flight conditions.

It is an object of the present invention to solve this long outstanding problem in a simple and workable manner. In accordance with my invention, an airplane is provided with wings designed specifically for economical high speed operation—hereinafter referred to as "speed wings"—and also with additional wings—hereinafter referred to as "high lift wings"—which are movable in flight from a load carrying position in which they greatly increase the load carrying capacity of the plane to a stored position in the streamlined form of the fuselage. The high lift wings may thus be used in getting the plane off the ground with a heavy load and in landing at low speed, while during flight they are swung to stored position in the streamlined form of the fuselage, where they are out of the slip stream, and do not increase the drag of the airplane or do not disturb in any way its flight characteristics.

The speed wings are preferably short, stubby wings of small area, with correspondingly high wing loading and of low camber to provide maximum lift with minimum drag at the high speed for which they are intended. The high lift wings are preferably of greater area and higher camber to provide maximum lift at the lower take-off and landing speeds. While such wings would have a considerable drag if kept in load carrying position at high speeds, the drag of the high lift wings in accordance with the invention, is eliminated by folding the wing to stored position in the streamlined form of the fuselage, so that neither the wings themselves nor the wing supporting structures project into the air stream during high speed flight.

As the drag of the small area low camber speed wings is much less than that of conventional wings, designed as a compromise between the requirements of take-off and flight conditions, and as the drag of the high lift wings is eliminated when such wings are in stored position, the plane, in accordance with my invention, is capable of much higher speed than heretofore obtainable. Moreover, the low drag results in economy of operation and greater range at less power and hence less fuel is required. Greater economy of operation also results from the fact that the plane can get off the ground with a larger pay-load. Alternatively the exceptional load carrying capacity of the plane under take-off conditions can be used to carry more fuel to obtain greater range. Safety in landing and take-off is assured by the high lift wings, whereby the plane can take-off and land at low speeds even when fully loaded. Moreover, the ability to take-off and land on shorter runways and improvised fields is of great value in military operations.

While my invention is applicable to all classes of planes including multi-fuselage planes and to flying boats and seaplanes, as well as land and carrier based planes, it is especially applicable to transports and bombers where high speed, long range and high load carrying capacity are prime considerations. The invention is accordingly illustrated as embodied in a bomber and will be more fully understood from the following description and accompanying drawings, in which Fig. 1 is a front elevation with the high lift wings in load carrying position.

Fig. 2 is a side elevation.

Fig. 6 is a fragmentary top plan view of the high lift wing mounting shown in Fig. 5, with portions of the structure broken away.

Fig. 7 is a vertical section on the line 7—7 of Fig. 6 showing the locking mechanism for the high lift wing.

Fig. 8 is a partial top plan view of a plane embodying a modification, and

Fig. 9 is a section on line 9—9 of Fig. 8.

Figure 3:
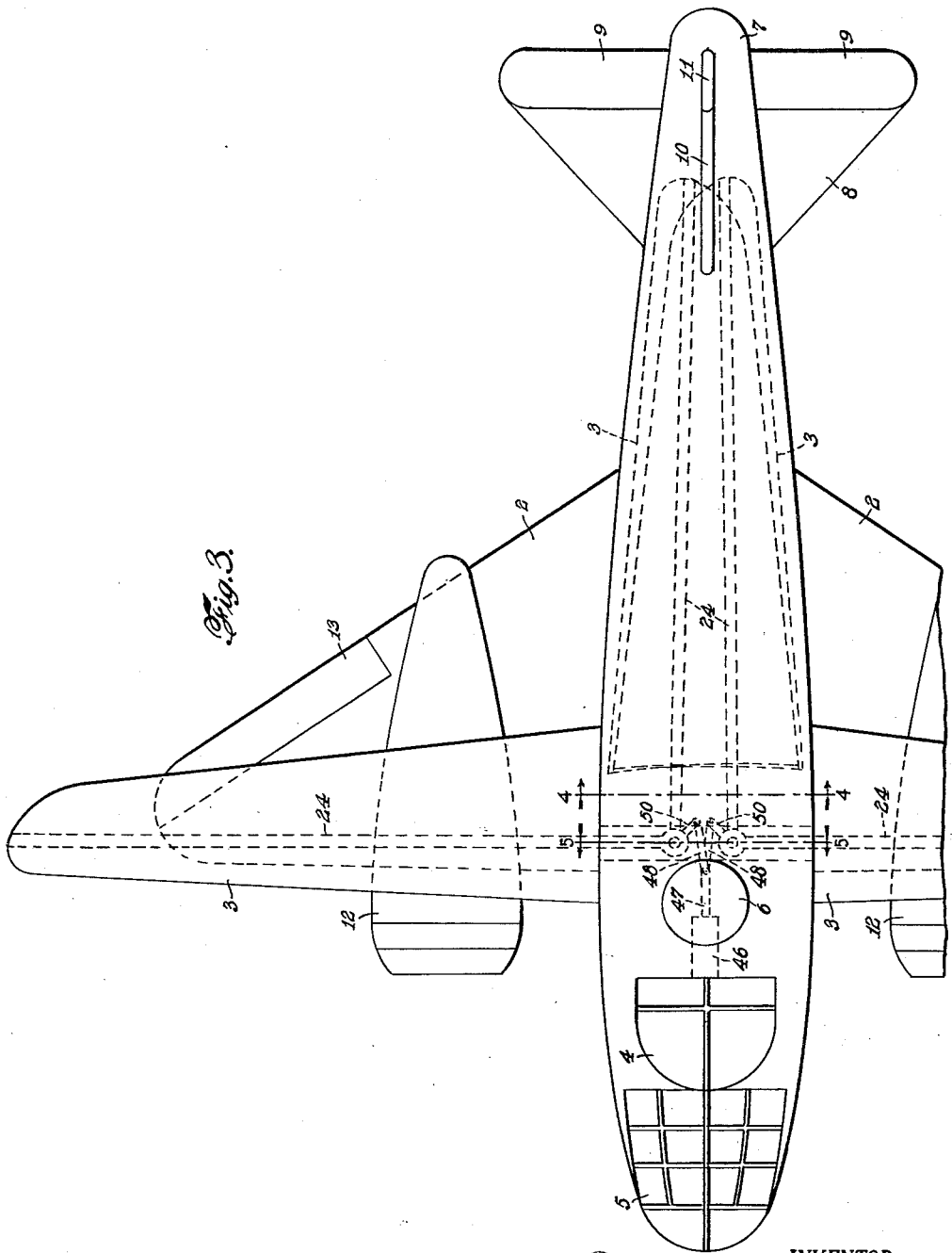
Fig. 3 is a top plan view.

The airplane shown by way of example in the drawings to illustrate my invention, has a fuselage 1, speed wings 2 and high lift wings 3. The fuselage is shown as having a bombardier station 4, a pilot station 5, a gun turret 6 and tail blister 7, and is provided with a suitable tail assembly shown as a horizontal stabilizer 8, elevator 9, vertical stabilizer 10, and rudder 11. A twin tail assembly may be used if desired without in any way interfering with the applicability of my invention.

The speed wings 2 are shown as being attached to the fuselage slightly below the center as is customary in low mid-wing monoplanes. While the speed wings may, if desired, be constructed so as to be folded or removed for storage purposes, they remain in fixed relation to the fuselage during flight and are hence referred to as fixed wings. The wings 2 are shown as carrying engine nacelles 12 and are provided with the usual ailerons 13.

The speed wings are designed specifically for high speed and are shown as short, stubby wings having a long base chord, short span and low camber. By reason of the short span and low camber in conjunction with proper airfoil design, the drag of the wings even at high speeds is exceptionally low. The area of the speed wings is preferably small in proportion to the total weight of the plane, so that the wing loading is correspondingly high, for example sixty to seventy pounds per square foot in contrast with the thirty to thirty five pounds customary in present day design. These small area speed wings have sufficient lift at high speed to sustain the fully loaded plane and the high wing loading contributes to economical operation at high speed, but the wings do not provide sufficient lift to support the plane with full load at the lower speeds desired for safe take-off and landing. The additional lift needed under take-off and loading conditions is provided by the high lift wings 3.

The wings 3 are shown as being mounted near the top of the fuselage and are movable from a load supporting position (shown in full lines in Figs. 1 and 3), in which they project laterally of the fuselage in vertically spaced relation to the speed wings 2, to a stored position in the streamlined form of the fuselage (dotted lines Fig. 3). The fuselage is accordingly provided with a wing storage space extending longitudinally thereof into which the high lift wings 3 are folded when in stored position. While the storage space can be outside the main structure of the fuselage, suitable bearings being provided so that with the wings in stored position, the fuselage and wings are fully streamlined, it is preferable to provide the fuselage with longitudinally extending recesses or openings into which the wings are folded as illustrated in the drawings. In the embodiment shown, the opening is provided with a hinged door 14, which is opened (dotted lines Fig. 4) to permit the wing to enter and then closed (full lines Fig. 4) to restore the streamlining of the fuselage. As the door extends longitudinally of the fuselage, its opening and closing is not interfered with by the air stream. If desired, the door may be divided into two or more sections. An auxiliary door 15 having a shape corresponding to the airfoil section of the high lift wing at its base cooperates with the main door 14 to close completely the opening in the fuselage when the high lift wing is in stored position, but is open when the wing is in load carrying position (Fig. 5), while the main door 14 is closed. Suitable means is provided for opening and closing the door 14, being illustrated as a hydraulic cylinder 16, shown in Fig. 5. Similar means may be provided for opening and closing the auxiliary door 15, or alternatively the door may be provided with a spring hinge 17 so that the door will be closed by the hinge and will be opened by cam action of the wing on the upper edge of the door when the wing is swung from stored to load carrying position.

Figure 4:
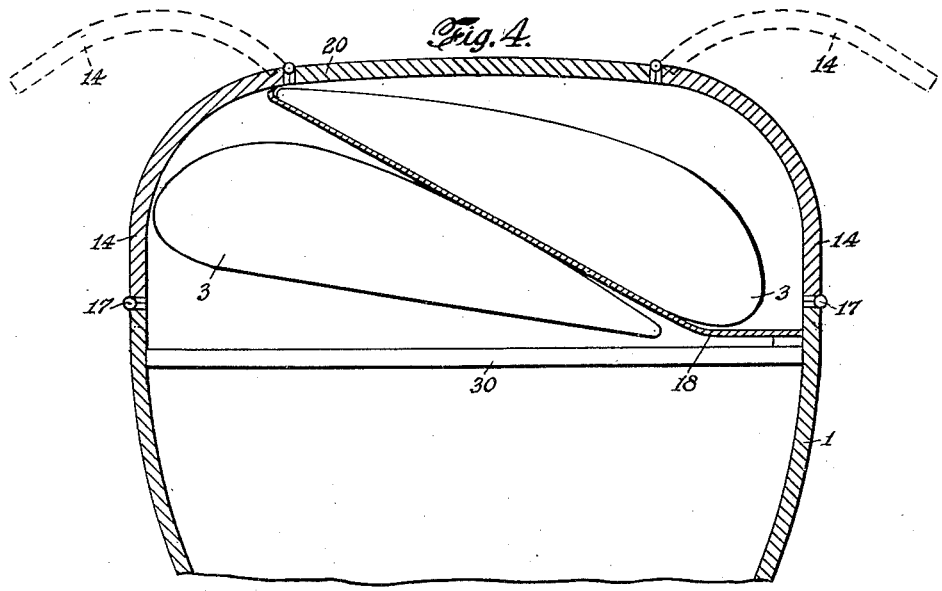
Fig. 4 is a section through the fuselage on the line 4—4 of Fig. 3.

In a single fuselage plane such as that illustrated, the high lift wings are mounted at opposite sides of the fuselage, and when in stored position, are nested one above the other, longitudinally of the fuselage with the chord of each wing approximately horizontal although preferably somewhat inclined at an acute angle to the horizontal, as shown in Figs. 2 and 4, so that they occupy a minimum of fuselage space. A partition 18 connected at one edge to the side wall of the fuselage and at the other to the roof section 20, located between the two doors 14, separates the two wings when in stored position. As the roof section 20 of the fuselage may be made as a longitudinally extending truss and is further supported by the forward portion of the vertical stabilizer 10 (Fig. 2) and by the doors 14 which form an angle with the roof section in both open and closed position (Fig. 4) and hence provide a construction analogous to an angle-iron, the roof will ordinarily be sufficiently strong without additional supporting means. However, if desired, one or more vertical supports 21 (Figs. 8 and 9) may extend up through the wing storage space, corresponding slots 22 being made in the trailing edges of the high lift wings to receive such roof supporting members when the wings are folded to stored position. Suitable flaps 23 are held by spring tension in position to cover the slots 22 when the wings are in load carrying positions, and are cammed aside by the supports 21 when the wings are swung into the fuselage.

Figure 5:
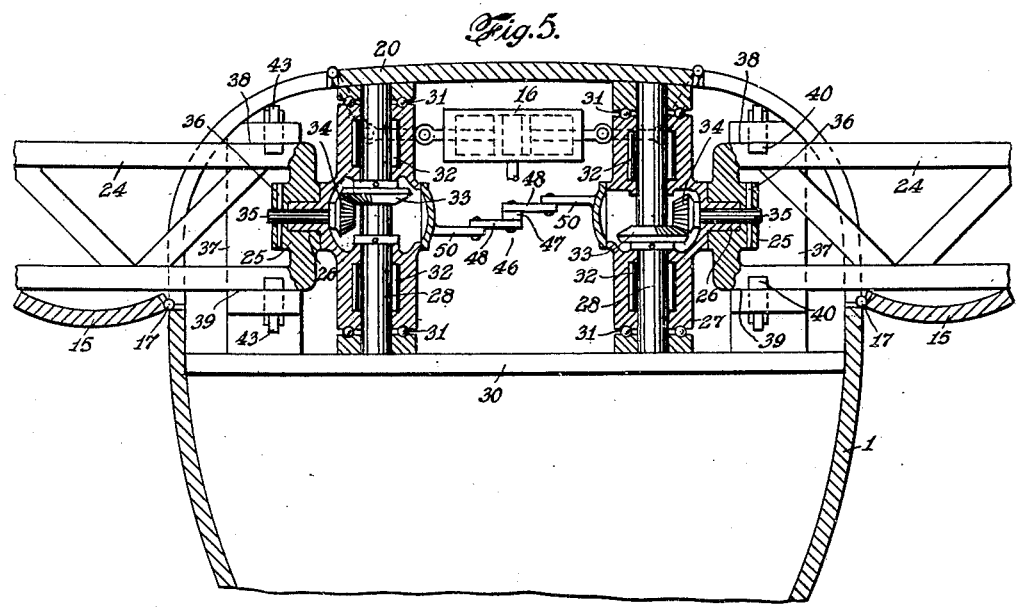
Fig. 5 is a section through the fuselage on the line 5—5 of Fig. 3.

To provide for movement from load carrying to stored position the high lift wing 3 is pivotally mounted on the fuselage structure the pivot being located adjacent the forward end of the wing storage space and inside the fuselage, so that when the high lift wings are swung to stored position there will be no projecting structure to create drag. The wing is also preferably tilted about an axis extending longitudinally of the wing is also preferably tilted about an axis extending longitudinally of the wing so as to be slightly inclined to the horizontal and occupy minimum fuselage space when in stored position. A wing mounting permitting these movements is shown in Figs. 5 to 7, where it will be seen that a structural member 24 of the wing 3 projects beyond the base of the wing and into the fuselage where it is pivotally mounted on the fuselage structure. In the drawings the high lift wing is shown as a mono-spar wing. The mono-spar construction is not only advantageous in a high camber wing where a deep, strong spar may be employed, but is also adaptable to the present invention, as the spar can be carried into the fuselage as the structural member for pivotally mounting the wing. The wing is approximately balanced statically and aero-dynamically on the spar, and this balance simplifies the stresses on the wing mounting and facilitates movement of the wing about its pivot and about its longitudinal axis. The structural member or spar 24 is provided at its projecting end with a horizontal bearing 25 engaging a trunnion 26 projecting laterally from a vertical bearing sleeve 27, rotatable on a pivot post 28 carried by the fuselage structure, indicated at 30. Antifriction bearings are preferably provided so that the wing will swing easily from one position to another, and are shown as ball-bearings 31 for taking vertical loads and roller or needle bearings 32 for taking bending moments of the wing. It will thus be seen that the wing is capable of swinging about the pivot post 28 from load carrying to stored position, and of turning on the trunnion 26 so that the wing may be tipped so as to be stored in space saving position.

The means for turning the wing about its longitudinal axis, i. e., about the trunnion 26, is shown in the drawings (Fig. 5) as comprising a beveled gear 33 engaging a second beveled gear 34 fixed on the inner end of a shaft 35 which extends through and beyond the trunnion 26, and is keyed to the bearing portion 25 of the wing spar 24 by a pin 36. As the wing swings about the pivot post 28 the beveled gear 34 is turned by its engagement with stationary gear 33 and through shaft 34 imparts corresponding turning motion to the wing. Where the wing is to be turned to only a slight angle mutilated gears may be used to provide the amount of turning desired. Instead of employing gears, as illustrated in Fig. 5, the wing may be tipped by engagement with suitable cams. In fact the partition 18 shown in Fig. 4 provides a cam surface which will engage the wings and tip them to proper position as they are swung into the wing storage spaces.

Locking means is provided for holding the high lift wings in load carrying position and is shown as a clamp 37 engaging the projecting portion of the wing spar 24. The clamp is of C form (Fig. 7) so as to engage three sides of the spar, and the upper and lower engaging faces 38 and 39 of the clamp and corresponding faces of the spar are preferably tapered so that the spar will enter the clamp easily and fit tightly when fully seated. Latches 40 engage the rear side of the spar to lock the wing in load carrying position. The latches are preferably spring balanced, being held in locking position by a spring 41 and having inclined faces 42 so that the latches will be automatically depressed by the spar when the latter is swung into the clamp. Mechanism for releasing the latches is shown as a bifurcated cam 43 straddling the latch and engaging laterally projecting pins 44. A wire or cable 45 is provided for pulling the cam 43 toward the right as viewed in Fig. 7, causing the pins 44 of the latch to ride up on the inclined faces of the cam, thereby moving the latch to retracted position. The clamps 37, which are securely fastened to the fuselage structure, prevent turning of the wings when in load carrying position and in conjunction with the pivot post 28 take the load resulting from the lift and drag of the wing in flight as well as the weight of the wing when the plane is on the ground. When the wings are in stored position, they are confined by the doors 14 of the fuselage and suitable buffers may be provided on the doors to engage the wings and hold them tightly in place. Alternatively, suitable releasable latch mechanism (not shown) may be provided for locking the wings in stored position.

By reason of the manner in which the high lift wing is mounted, its movement from load carrying position to stored position is virtually automatic and can be controlled by the locking mechanism described above, and by the speed and angle of flight of the plane. The swinging of the wings from one position to another can be effected by tipping the pivot posts 28 in the same manner that a door will swing if its hinges are not in a vertical line. The pivot posts 28 can of course be tipped by tilting the airplane. If, with the wings in load carrying position, the plane is nosed up and the latches 40 are released, the wings will be swung to stored position by gravity and also by the drag acting on the wings. To swing the wings from stored to load carrying position, the air speed is first reduced almost to the stalling point and the plane is then nosed down so that the wings are swung forwardly and outwardly by gravity. This motion is of course opposed by the drag of the wings, but this is reduced by reason of the reduced air speed. The effect of gravity may be increased by carrying gas tanks or other load in the wings.

While the high lift wings are thus self-actuating, it is desirable to provide means for damping and controlling the swing of the wings and for insuring operation under all conditions. In the drawings (Figs. 5 and 6) such means is shown as a double-acting hydraulic cylinder 46, the piston rod 47 of which is connected by a pivoted link 48 to an arm 50 projecting laterally from the vertical bearing sleeve 27. The arm 50 preferably projects at an angle of approximately 45° to the axis of the wing spar 24, as shown in Fig. 6. While a separate cylinder can be provided for each wing, it is preferable to employ a single cylinder connected to both wings, as shown. This connection assures that the wings will swing in or out in unison and thus maintain lateral stability of the ship. Owing to the self-actuating properties of the high lift wings, relatively little power is required to swing them.

When the high lift wings are swung from load carryng to stored position, the center of gravity of the wings is moved rearwardly of the plane and hence the resultant center of gravity of the plane as a whole is shifted toward the rear. To prevent this movement of the center of gravity disturbing the longitudinal stability of the plane, the high lift wings are mounted so that in load carrying position, their center of lift lies ahead of the center of lift of the speed wings 2. The resultant center of lift of both sets of wings when the high lift wings are in load carrying position is thus forward of the center of lift of the speed wings which alone support the plane when the high lift wings are in stored position. The center of lift of the plane thus moves rearwardly when the high lift wings are swung to stored position, and this movement compensates for the shift in the center of gravity, thereby maintaining longitudinal stability of the plane.

In a twin fuselage plane, a single high lift wing can be mounted on each fuselage so as to swing in to its respective fuselage, when the wings are to be stored for high speed flying. If desired, movable sections or doors can be provided in the skin of the high lift wings to give access during flight to storage compartments in the wings. This can also be done in the case of the lower of the two high lift wings shown in Fig. 4. If it is desired to mount the speed wings at the top of the fuselage as in a high wing monoplane, the high lift wings may be mounted below the speed wings, suitable storage space being provided in the lower part of the fuselage to receive them.

The operation of my invention will be understood from the preceding description. In taking off, the high lift wings are locked in load carrying position, the doors 14 of the fuselage wing storage space are closed, and the auxiliary door 15 is open and lies under the wing (Fig. 5). When sufficient altitude has been reached the doors 14 are opened, the latches 40 are released, and the high lift wings are swung into the wing storage space of the fuselage, whereupon doors 14 and 15 are closed. When a landing is to be made, the doors are opened and the high lift wings are swung out to load carrying position and locked in place. The doors 14 are then closed to restore the streamline of the fuselage, while auxiliary door 15 remains open since the space it is designed to close is now occupied by the high lift wing.

Instead of providing merely an auxiliary lift device for use in take-off and landing, the present invention is based on the different principle of utilizing two sets of wings, one of which is designed specifically for ultra high speed flight, and the other for high lift at low speeds. Thus the speed wings are preferably short, stubby, low camber wings of small area and correspondingly high wing loading. The high lift wings are preferably of greater camber, for example, 30% of the chord as against 15% for the speed wings, to provide maximum strength and load carrying capacity at low speeds. The span of the high lift wings is preferably equal to or greater than that of the speed wings. At the low take-off and landing speeds characteristic of the plan, in accordance with the present invention, the high lift wings take over a major portion of the load from the speed wings, reducing the wing loading of the latter by at least one half. Thus, each set of wings is specialized, the high lift wings carrying the bulk of the load in take-off and landing, while the speed wings alone support the plane during high speed flight, the high lift wings being folded into the streamlined form of the fuselage to eliminate their drag and make exceptionally high speed possible. The invention thus attains with simple structure the advantages of greater speed, more economical operation, greater range, and greater load carrying capacity, while at the same time reducing take-off and landing speeds to a point where the present hazards of take-off and landing are greatly minimized.

What I claim and desire to secure by Letters Patent is:

1. In an airplane, the combination of a fuselage having a roof portion and opening extending longitudinally of the fuselage on each side of said roof, a wing storage compartment under said roof, roof supporting members extending up through said wing storage compartment, and wings foldable into stored position in said compartment and having transverse slots to receive said roof supporting members.

2. In an airplane, the combination with a fuselage and speed wings, of a high lift wing, means pivotally supporting said high lift wing to swing from a load carrying position in which said high lift wing projects laterally through an opening in the side of said fuselage to a stored position inside of said fuselage, a door provided in the side of the fuselage and extending longitudinally thereof, means for opening said door to permit said high lift wing to pass therethrough in swinging from one position to another, and a second door for closing said first mentioned opening when said high lift wing is in stored position.

3. In an airplane, the combination with a fuselage and speed wings, of high lift wings provided at opposite sides of the fuselage and means for pivotally mounting said high lift wings for movement in flight from a load carrying position in which said high lift wings project laterally from the fuselage in vertically spaced relation to the speed wings, to a stored position in which said high lift wings are nested one superimposed above the other inside of said fuselage and extending longitudinally thereof.

4. In an airplane, the combination of a fuselage having an opening extending longitudinally thereof, a closure for said opening, a vertical pivot supported by the fuselage structure and located inside of the fuselage adjacent the forward end of said opening, and a wing mounted on said pivot and adapted to swing inwardly about said pivot through said opening from a load carrying position projecting laterally from the fuselage to a stored position in which said wing is enclosed inside of said fuselage.

5. In an airplane, the combination with a fuselage, of load carrying wings, means pivotally mounting said wings to swing from a load carrying position in which said wings project laterally at opposite sides of the fuselage, to a stored position in the fuselage, and means for tilting said wings in opposite directions about their longitudinal axes to nest one superimposed above the other with the chord of one of said wings inclined upwardly at the trailing edge and the chord of the other wing inclined downwardly at the trailing edge when in stored position, so as to occupy minimum fuselage space.

6. In an airplane, the combination of a fuselage having a compartment extending longitudinally thereof, a door for said compartment, means for opening and closing said door, a load carrying wing, means for mounting said wing for pivotal movement about substantially vertical and substantially spanwise extending axes, and means for swinging said wing about said substantially vertical axis from a load carrying position in which said wing projects laterally from the fuselage to a stored position in which it is enclosed inside of said compartment by said door and for tilting said wing about said substantially spanwise extending axis to incline the chord of the wing at an acute angle to the horizontal when in stored position.

7. In an airplane, the combination of a fuselage having a compartment extending longitudinally thereof, a door for said compartment, means for opening and closing said door, a pivot in said compartment, a wing mounted on said pivot for movement in and out of the compartment from a load carrying position in which said wing projects laterally from the fuselage to a stored position in which it is enclosed inside of said compartment by said door, and means for moving said wing from one to the other of said positions.

8. In an airplane, the combination of a fuselage having an opening extending longitudinally thereof, a closure for said opening, a mono-spar wing having a spar about which the wing is approximately balanced statically and aerodynamically, said spar projecting at one end beyond the base of the wing, and means carried by said fuselage pivotally supporting the projecting end of said spar at a point inside the fuselage and adjacent the forward end of said opening in such manner that the wing is supported in a load carrying position in which the wing projects laterally of the fuselage, and is swingable about said pivot and through said opening to a stored position in which said wing is enclosed inside of the fuselage.

9. In an airplane, the combination of a fuselage having an opening extending longitudinally thereof, a closure for said opening, a high speed wing attached to said fuselage, a high lift wing of substantially greater camber than said high speed wing, and means for pivotally mounting said high lift wing to swing through said opening from a load supporting position in which it projects laterally from the fuselage to a stored position in which it is enclosed inside of said fuselage and extends longitudinally thereof.

10. In an airplane, the combination of a fuselage having an opening extending longitudinally thereof, a closure for said opening, a speed wing attached to said fuselage, a high lift wing, and means for pivotally mounting said high lift wing to swing through said opening from a load supporting position in which it projects laterally from the fuselage in vertically spaced relation to said speed wing, to a stored position in which it is enclosed inside of said fuselage.

CARL ROE.